United States Patent [19]

Schweitzer, Jr.

[11] Patent Number: 5,008,651
[45] Date of Patent: Apr. 16, 1991

[54] BATTERY-POWERED FAULT INDICATOR

[76] Inventor: Edmund O. Schweitzer, Jr., 2433 Center St., Northbrook, Ill. 60062

[21] Appl. No.: 551,043

[22] Filed: Jul. 9, 1990

Related U.S. Application Data

[63] Continuation of Ser. No. 433,674, Nov. 8, 1989, abandoned.

[51] Int. Cl.$^5$ .............................................. G08B 21/00
[52] U.S. Cl. .................................... 340/664; 340/691; 324/133; 361/93
[58] Field of Search ............... 340/664, 657, 691, 715; 361/91, 92, 93; 324/96, 133

[56] References Cited

U.S. PATENT DOCUMENTS

| | | | |
|---|---|---|---|
| 3,660,757 | 5/1972 | Winslow | 324/122 |
| 3,667,039 | 5/1972 | Garfein et al. | 324/92 |
| 3,906,477 | 9/1975 | Schweitzer, Jr. | 340/691 X |
| 4,139,820 | 2/1979 | Rode | 324/133 |
| 4,152,639 | 5/1979 | Chaffee | 324/508 |
| 4,152,643 | 5/1979 | Schweitzer, Jr. | 324/120 |
| 4,259,634 | 3/1981 | Okamoto et al. | 324/74 |
| 4,263,550 | 4/1981 | Schweitzer, Jr. | 324/133 |
| 4,301,407 | 11/1981 | Koslar | 324/96 |
| 4,438,403 | 3/1984 | Schweitzer, Jr. | 324/133 |
| 4,458,198 | 7/1984 | Schweitzer, Jr. | 324/133 |
| 4,495,489 | 1/1985 | Schweitzer, Jr. | 340/664 |
| 4,503,389 | 3/1985 | Singer | 324/133 |
| 4,550,288 | 10/1985 | Schweitzer, Jr. | 324/133 |
| 4,559,496 | 12/1985 | Harnden, Jr. et al. | 324/127 |
| 4,641,220 | 2/1987 | Schweitzer, Jr. | 361/187 |
| 4,686,518 | 8/1987 | Schweitzer, Jr. | 340/664 |
| 4,714,916 | 12/1987 | Schweitzer, Jr. | 340/664 |
| 4,794,329 | 12/1988 | Schweitzer, Jr. | 324/127 |
| 4,794,332 | 12/1988 | Schweitzer, Jr. | 324/133 |
| 4,823,078 | 4/1989 | Mohebban | 324/133 |
| 4,881,028 | 11/1989 | Bright | 324/133 |

FOREIGN PATENT DOCUMENTS

| | | |
|---|---|---|
| 1011161 | 12/1948 | France . |
| 1199016 | 7/1970 | United Kingdom . |

OTHER PUBLICATIONS

"Liquid Crystal Display", publication of Hamlin Inc., Lane and Grove Streets, Lake Mills, Wisconsin, circa Jun. 1, 1989.

Primary Examiner—Joseph A. Orsino
Assistant Examiner—Jeffery A. Hofsass
Attorney, Agent, or Firm—Lockwood, Alex, Fitzgibbon & Cummings

[57] ABSTRACT

A fault indicator operable from an internal battery for indicating the occurrence of a fault current in a monitored electrical conductor of an AC power distribution system. Upon occurrence of a fault current a reed switch in magnetic communication with the monitored conductor momentarily closes to connect the internal battery to a capacitor, which is charged by the battery during the switch closure. The capacitor is connected to the display electrodes of a high impedance liquid crystal display, which displays an "F" to indicate fault occurrence. The fault indication may be reset either by the slow discharge of the capacitor, by discharging the capacitor through a second reed switch manually actuated by a magnetic reset tool from outside the fault indicator housing, or automatically upon restoration of power in the conductor.

30 Claims, 3 Drawing Sheets

BATTERY-POWERED FAULT INDICATOR

BACKGROUND OF THE INVENTION

This case is a continuation of application Ser. No. 433,674, filed Nov. 8, 1989, now abandoned.

The present invention is generally directed to circuit monitoring devices, and more particularly, to an improved battery-powered fault indicator.

Various types of fault indicators have been constructed for detecting electrical faults in power distribution systems, including clamp-on type fault indicators, which clamp over a cable of the system and derive their operating power from the magnetic field surrounding the cable, test-point mounted type fault indicators, which attach to test point sockets provided on connectors or other system components and derive their operating power by means of a capacitive coupling to the monitored conductor, and battery-powered fault indicators, which derive their operating power from an internal battery. These three types of fault indicators may be either self-resetting, wherein the fault indication is automatically reset following resumption of current flow in the conductor, or manually reset, wherein an operator must manually clear a fault indication.

In previous fault indicators detection and indication of fault currents has typically been accomplished by circuitry which included a reed switch positioned in close proximity to the monitored conductor, and an electromagnetic indicator actuated by the circuitry to either fault or reset indicating positions. Upon occurrence of a fault current, the reed switch was actuated and current flowed through a magnetic winding to magnetize a magnetic pole assembly, which magnetically positioned a movable indicator, typically a rotatably mounted flag member visible from the exterior of the indicator housing, to a fault-indicating position. In self-resetting indicators, a reset current typically remagnetized the magnetic pole assembly to reposition the flag member to a reset-indicating position.

The use of an electromagnetic indicators in such prior fault indicators, while providing satisfactory performance, undesirably complicated their manufacture by requiring the fabrication, assembly and adjustment of a number of precision parts of different materials. The physical size of practical electromagnetic indicator constructions prevented a desired reduction in the size of prior fault indicator housings. Moreover, in battery-powered fault indicators, the use of limited battery power for the relatively large power requirements of an electromechanical indicator was undesirable.

The present invention overcomes these drawbacks by providing a battery-powered fault indicator which incorporates a high impedance non-mechanical electronic indicator in the form of a liquid crystal display. This results in an improved fault indicator which is more compact and easier to manufacture, and which provides in a preferred construction an indication to the user as to whether the monitored line is powered.

Accordingly, it is a general object of the present invention to provide a new and improved battery-powered fault indicator.

It is a more specific object of the present invention to provide a battery-powered fault indicator which avoids the use of electromechanical indicator mechanisms.

It is a still more specific object of the invention to provide a battery-powered fault indicator which is more compact and easier to manufacture.

SUMMARY OF THE INVENTION

The invention is directed to a fault indicator operable from a battery for indicating the occurrence of a fault current in a monitored electrical conductor. The fault indicator includes a housing, and status indicating means within the housing comprising a high impedance display device having at least a pair of display electrodes disposed in operative association with a layer of voltage-responsive light controlling material, the display device providing on the exterior of the housing a first display condition in the absence of an actuating signal applied to the display electrodes, and a second display condition in the presence of an actuating signal applied to the display electrodes. The indicator further includes charge storage means, switch means rendered conductive upon the occurrence of a fault current in the monitored conductor for momentarily connecting the battery to the charge storage means to develop a charge therein following the fault current, and circuit means for connecting the charge storage means to the display electrodes whereby the high impedance display device is caused to display the second condition following the fault current.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the several figures of which like reference numerals identify like elements, and in which:

DESCRIPTION OF THE PREFERRED EMBODIMENT

Figure 1:
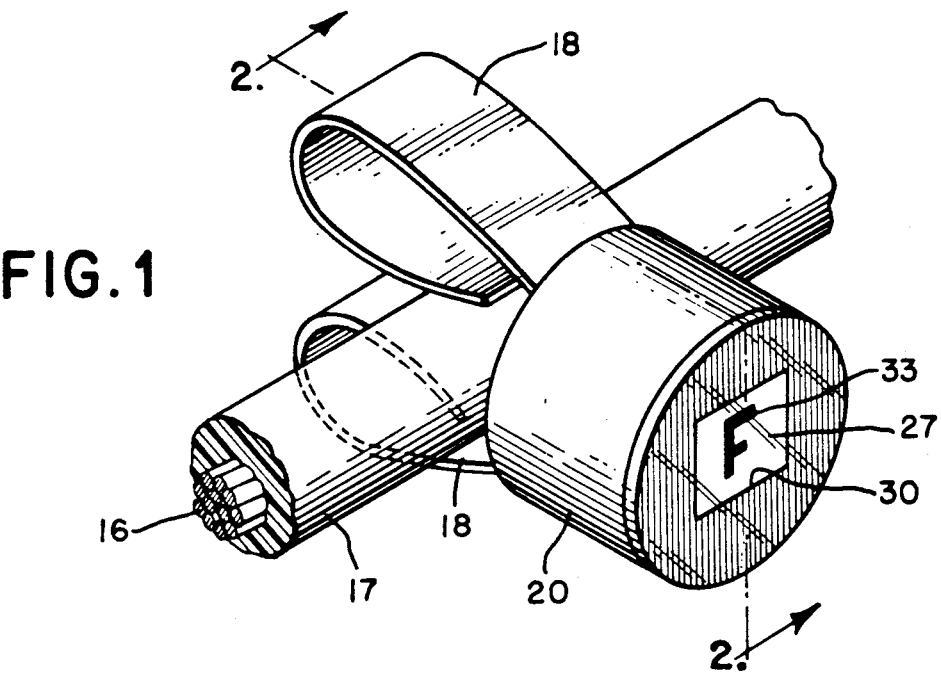
FIG. 1 is a perspective view, showing a battery-powered fault indicator constructed in accordance with the invention mounted on a power distribution cable.
Figure 2:
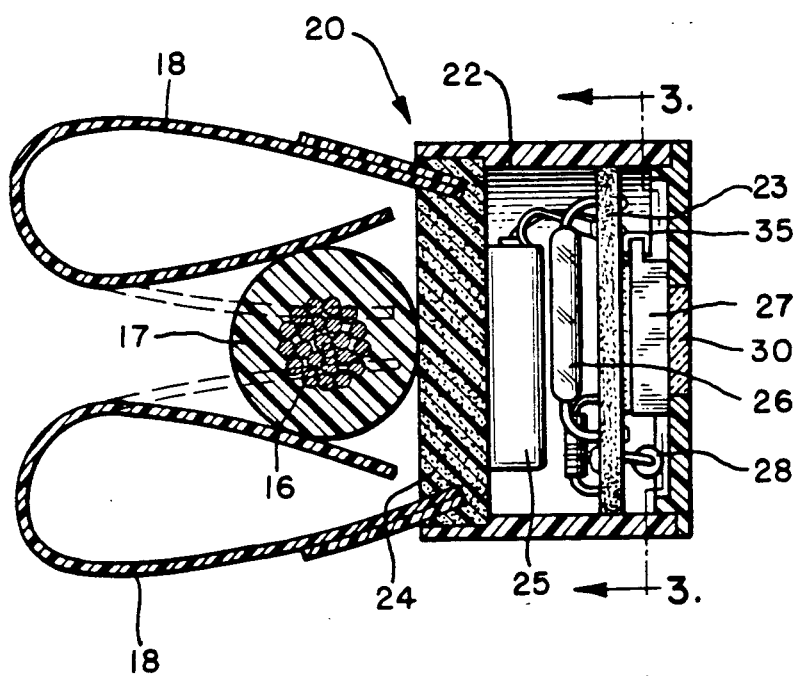
FIG. 2 is an enlarged cross-sectional view of the cable-mounted fault indicator taken along line 2—2 of FIG. 1.
Figure 3:
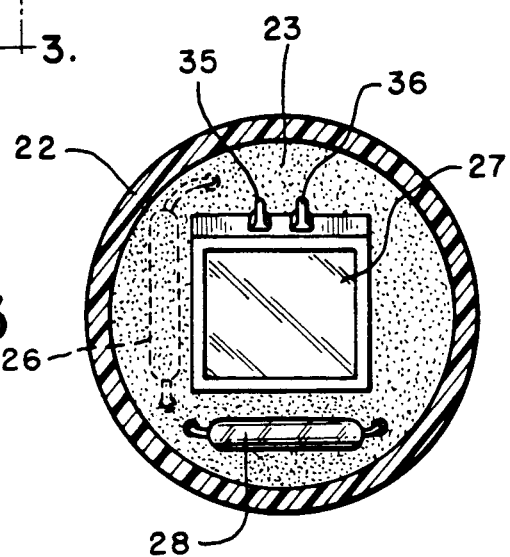
FIG. 3 is a cross-sectional view of the cable-mounted fault indicator taken along line 3—3 of FIG. 2.

Referring to the drawings, and particularly to FIGS. 1-3, a fault indicator module 20 constructed in accordance with the invention for detecting faults in the conductor 16 of a flexible cable 17 of the type commonly utilized in power distribution systems is seen to include a generally cylindrical housing 22, formed of an insulating plastic or similar material and attached by flexible arms 18 to the cable, within which the electrical components of the fault indicator are contained. In particular, within housing 22 the fault indicator module includes a disc-shaped insulator board 23 positioned perpendicularly to the axis of the housing at a location intermediate the ends thereof, and a layer 24 (FIG. 4) of high electrical resistance potting compound at the inside end of the housing for securing the insulator board in place. Additional electrical components included in housing 22 include, in accordance with the invention, a battery 25, a reed switch 26 aligned tangentially to the monitored conductor for sensing the occurrence of a fault current in the conductor, a high impedance electronic display component 27 for visually indicating the occurrence of a fault current, and an optional second reed switch 28 aligned parallel to the monitored conductor for manually resetting a fault condition.

As shown in FIGS. 2 and 3, within housing 22 the liquid crystal display component 27 is positioned against a transparent window 30 such that the indicator face of the component is readily viewable from the exterior of the housing. A mask formed of a thin sheet of opaque material may be provided on the inside surface of window 30 so that only the indicator face can be seen. The liquid crystal display component 27 is capable of producing a display 33 in the form of an "F". Electrical connections are made with the component by means of two electrically conductive terminals 35 and 36 arranged along the top edge of the component.

Figure 4:
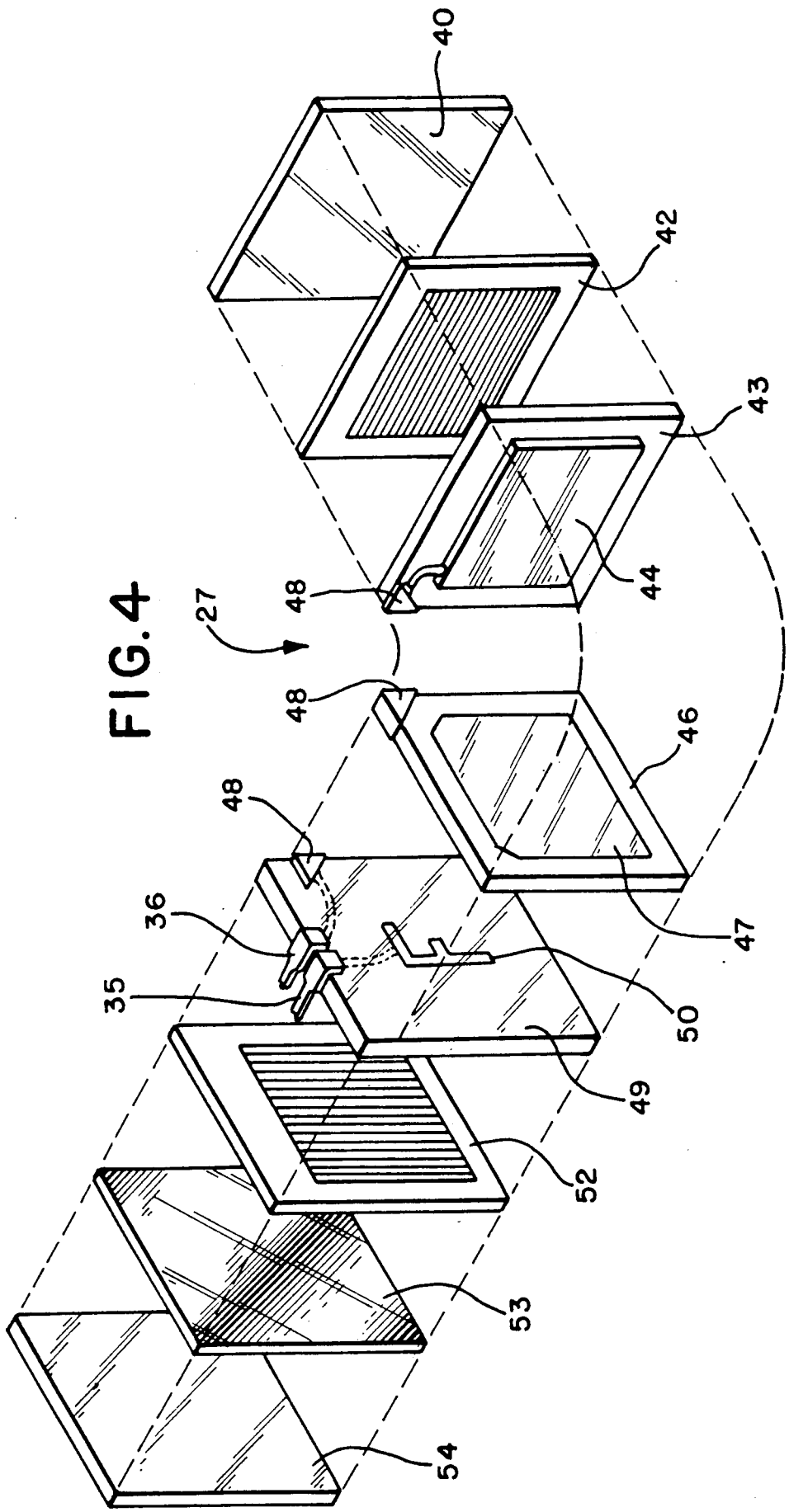
FIG. 4 is an enlarged exploded perspective view showing the principal elements of the liquid crystal display component utilized in the fault indicator of FIGS. 1-3.
Figure 5:
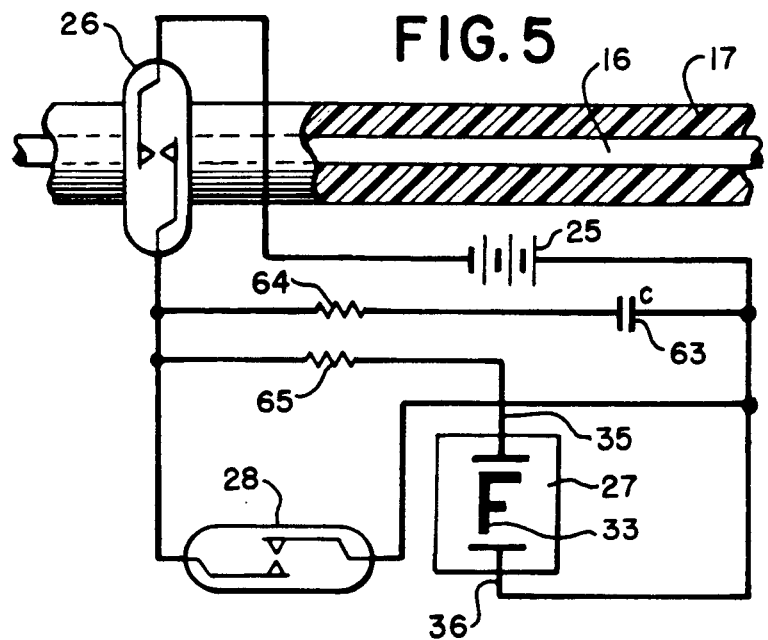
FIG. 5 is an electrical schematic diagram of the fault indicator of FIGS. 1-3.
Figure 6:
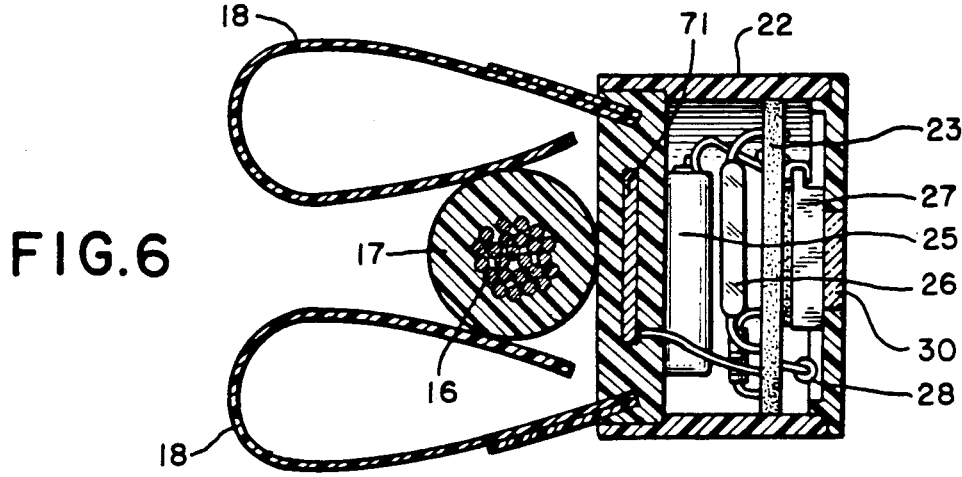
FIG. 6 is a cross-sectional view of a battery-powered self-resetting fault indicator installed on a power distribution cable.

Internally, as shown in FIG. 4, the liquid crystal display component 27 includes, generally, a transparent face plate 40, a front polarizer 42, a glass plate 43 on which a single transparent backplane electrode 44 is provided, a perimeter seal 46 containing a layer 47 of twisted nematic liquid crystal material, electrically conductive edge contacts 48, a glass plate 49 on which a single transparent indicator segment electrode 50 is contained, a rear polarizer 52 aligned at right angles to front polarizer 42, a reflector 53 and a rear supporting plate 54.

Display component 27 is conventional in construction and operation. The "F" display is formed by the nematic liquid crystal layer 47, which in the absence of an applied electric field has the property of rotating the polarization of light as it passes through the molecular layers of the layer. In particular, as randomly polarized light enters the display component through face plate 40, only vertically polarized light is able to pass through front polarizer 42. In the absence of an applied electric field, the polarization of this polarized light is rotated 90° as it passes through liquid crystal layer 47 and reaches the rear polarizer 50. Since the polarization of the light has been rotated the light is able to pass through this polarizer onto the reflective layer 51, wherein it is reflected back through polarizer 50, rotated by liquid crystal layer 47 and passed through polarizer 42 to front plate 40 and window 30. Thus, in the absence of an applied electric field light entering face plate 40 is passed through the device and reflected back out, presenting a blank or white colored appearance to the observer.

By applying an electric field between the indicator electrodes 44 and 50 the liquid crystal layer, in the intervening portion, is caused to pass incoming light without rotating its polarization, thereby selectively blocking the transmission and reflection of light to the viewing window 30 in the associated "F" pattern. The result is that the selected character is displayed to the viewer as a darkened letter.

Figure 7:
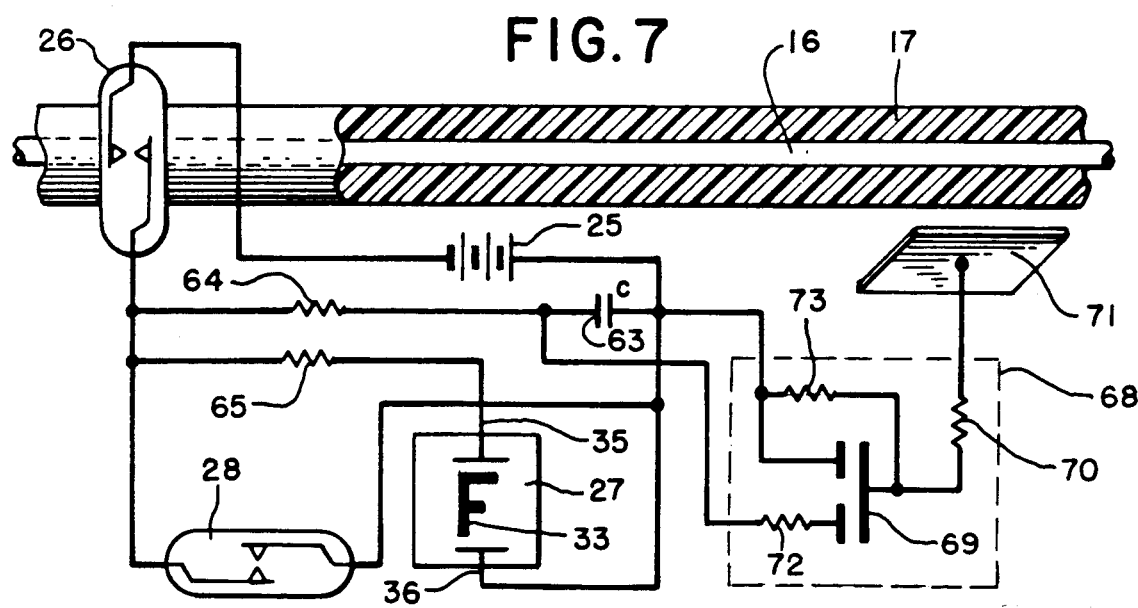
FIG. 7 is an electrical schematic diagram of the fault indicator of FIGS. 5 and 6.

Referring to FIG. 7, the necessary signal for actuating the "F" display 33 is provided by circuitry within housing 22. In particular, upon occurrence of a fault current, battery 25 is momentarily connected by reed switch 26 to a capacitor 63, which is charged by the battery during the switch closure. A series-connected resistor 64 serves to control the rate at which the capacitor is charged. The voltage developed across capacitor 63 by the charge is applied to the "F" display electrodes of display component 27 through a resistor 65, causing the display component to display the desired "F" character. This display continues until the charge on capacitor 63 and its associated voltage level depletes to a level insufficient to maintain the alignment of the molecules in the nematic liquid crystal layer. In practice, capacitor 63 will have sufficient charge to maintain the fault indication for up to 36 hours, the actual display duration being dependent primarily on the net charge on the capacitor and the internal leakage current of the capacitor. A lesser time duration may be provided if desired by increasing the current drain from the capacitor.

Once the fault indication has occurred, should it be desired to cancel the "F" indication, as for example when re-powering the affected circuit after a transient fault, it is only necessary to discharge capacitor 63 by actuating the manual reset reed switch 28 by momentarily applying a magnetic field at the exterior of the housing. To this end, the reed switch is preferably located at an accessible location near the front face plate of the housing, with its axis aligned generally parallel to the axis of conductor 16 so that the switch will not be actuated by fault currents in the conductor.

In many applications it is desirable that following a fault occurrence a fault indicator be self-resetting, i.e., automatically return to a reset state upon restoration of voltage to the monitored conductor. As shown in FIG. 7, this may be accomplished by providing an optional reset circuit 68 which includes a field effect transistor (FET) 69 having principal source and drain electrodes connected through a resistor to capacitor 63, and a high impedance gate electrode coupled through a series anti-resonance resistor 70 to the monitored AC conductor by means of a capacitive coupling plate 71.

Upon restoration of voltage in the conductor, FET 69 is caused to conduct and discharge capacitor 63. A fixed series resistance 72 reduces the rate of discharge through the principal electrodes of FET 69 to preclude capacitor 63 from being discharged during a fault, prior to interruption of voltage on the monitored conductor, as well as preventing the discharge current from exceeding the limits of the FET. An additional resistor 73 connected between the drain and gate electrodes biases the device to a cut-off state in the absence of a signal on the gate electrode.

While the use of other types of high impedance voltage-actuated light controlling devices is possible, liquid crystal display (LCD) components are particularly well adapted to the invention. The high input impedance of these devices, typically in excess of $10 \times 10^{-15}$ ohms, results in a very low current drain from the display capacitor. This allows the capacitor to retain sufficient charge for operating the display over an extended period, typically in excess of 36 hours, limited primarily by the internal leakage current of the capacitor. In practice, this is more than sufficient time for a repair crew to locate and repair a fault, even in a large power distribution system. A lesser reset time may in fact be preferred in some applications.

Furthermore, depending on the particular liquid crystal material used, LCD components exhibit a well defined threshold voltage below which the display does not respond to an applied signal. In one successful embodiment of the invention using a type 7 LCD manufactured by Hamlin, Inc. of Lake Mills, Wis., U.S.A., this threshold is 2.0 volts, which is sufficiently high to prevent the display from falsely responding to residual voltages, but not no high as to require an undesirably large charge on the display capacitor.

While an "F" shaped display has been shown, it will be appreciated that other display characters, or symbols, can be used instead. For example, the "F" can be replaced with an "S" (for "short-circuit") or a downwardly pointing arrow symbol.

While particular embodiments of the invention have been shown and described, it will be obvious to those skilled in the art that changes and modifications may be made therein without departing from the invention in its broader aspects, and, therefore, the aim in the appended claims is to cover all such changes and modifications as fall within the true spirit and scope of the invention.

I claim:

1. A fault indicator operable from a battery for indicating the occurrence of a fault current in a monitored electrical conductor, comprising:
    a housing;
    status indicating means within said housing comprising a high impedance display device having at least a pair of display electrodes disposed in operative association with a layer of voltage-responsive light controlling material, the display device providing on the exterior of said housing a first display condition in the absence of an actuating signal applied to said display electrodes, and a second display condition in the presence of an actuating signal applied to said display electrodes;
    charge storage means;
    switch means rendered conductive upon the occurrence of a fault current in the monitored conductor for momentarily connecting the battery to said charge storage means to develop a charge therein following the fault current; and
    circuit means for connecting said charge storage means to said display electrodes whereby said high impedance display device is caused to display said second condition following the fault current.

2. A battery-powered fault indicator as defined in claim 1 wherein said charge storage means comprise a capacitor.

3. A battery-powered fault indicator as defined in claim 1 wherein said switch means comprise a reed switch actuated by the magnetic field accompanying the occurrence of the fault current in the monitored conductor.

4. A battery-powered fault indicator as defined in claim 1 further including an impedance connected in series with said switch means, said battery and said charge storage means for reducing current flow through said switch means during the momentary closure thereof.

5. A battery-powered fault indicator as defined in claim 1 wherein said high impedance display device comprises a liquid crystal display having at least one pair of display electrodes comprising a display segment electrode and an associated backplane electrode.

6. A battery-powered fault indicator as defined in claim 1 further including reset switch means user-actuable from the exterior of said housing for discharging said charge storage means to condition said display device to said first display condition.

7. A battery-powered fault indicator as defined in claim 6 wherein said reset switch means comprise a reed switch magnetically actuable from the exterior of the housing.

8. A battery-powered fault indicator as defined in claim 7 wherein said reed switch is aligned generally parallel to the monitored conductor.

9. A battery-powered fault indicator as defined in claim 1 further including a reset circuit for automatically discharging said charge storage means upon restoration of voltage in the monitored conductor to condition said display device to said first display condition.

10. A battery-powered fault indicator as defined in claim 9 wherein said reset circuit comprises transistor switch means having principal electrodes connected across said charge storage means and a high impedance control electrode capacitively coupled to the monitored conductor.

11. A battery-powered fault indicator as defined in claim 10 wherein said switch means comprise a field effect transistor.

12. A fault indicator operable from a battery for indicating the occurrence of a fault current in a monitored AC conductor, comprising:
    a housing;
    status indicating means within said housing comprising a high impedance display device having at least one pair of display electrodes disposed in operative association with a layer of voltage-responsive light controlling material, the display device providing on the exterior of said housing a first display condition in the absence of an actuating signal applied to said display electrodes, and a second display condition in the presence of an actuating signal applied to said display electrodes;
    a capacitor;
    switch means rendered operative upon the occurrence of a fault current in the monitored conductor for momentarily connecting the battery to said capacitor to establish a charge in said capacitor; and
    said display electrodes of said display device being connected to said capacitor to condition said display device to said second display condition in the presence of said charge.

13. A battery-powered fault indicator as defined in claim 12 wherein said switch means comprise a reed switch actuated by the magnetic field accompanying the occurrence of a fault current in the monitored conductor.

14. A battery-powered fault indicator as defined in claim 13 further including an impedance connected in series with said reed switch, the battery and said capacitor for reducing current flow through said reed switch during the transfer charge from the battery to said capacitor.

15. A battery-powered fault indicator as defined in claim 12 further including reset switch means user-actuable from the exterior of said housing for discharging said capacitor to condition said display device to said first display condition.

16. A battery-powered fault indicator as defined in claim 15 wherein said reset switch means comprise a reed switch magnetically actuable from the exterior of the housing.

17. A battery-powered fault indicator as defined in claim 16 wherein said reed switch is aligned generally parallel to the monitored conductor.

18. A battery-powered fault indicator as defined in claim 12 further including a reset circuit for automatically discharging said capacitor upon restoration of voltage in the monitored conductor to condition said display device to said first display condition.

19. A battery-powered fault indicator as defined in claims 18 wherein said reset circuit comprises transfer switch means having principal electrodes connected across said capacitor and a high impedance control electrode capacitively coupled to the monitored conductor.

20. A battery-powered fault indicator as defined in claim 19 wherein said switch means comprise a field effect transistor.

21. A battery-powered fault indicator as defined in claim 12 wherein said high impedance display device comprises a liquid crystal display having at least one pair of display electrodes including a display segment electrode and an associated backplane electrode.

22. A fault indicator operable from a battery for indicating the occurrence of a fault current in a monitored AC conductor, comprising:
   a housing;
   status indicating means within said housing comprising a high impedance display device having at least one pair of display electrodes disposed in operative association with a layer of voltage-responsive light controlling material, the display device providing on the exterior of said housing a first display condition in the absence of an actuating signal applied to said display electrodes, and a second display condition in the presence of an actuating signal applied to said display electrodes;
   a capacitor;
   switch means rendered momentarily conductive by the magnetic field surrounding the monitored conductor upon the occurrence of a fault current in the conductor for momentarily connecting the battery to said capacitor to establish a charge in the capacitor; and
   said display electrodes of said display device being connected to said capacitor whereby said display device is caused to display said second display condition when said capacitor is charged.

23. A battery-powered fault indicator as defined in claim 22 wherein said switch means comprise a reed switch actuated by the magnetic field surrounding the monitored conductor.

24. A battery-powered fault indicator as defined in claim 23 further including an impedance connected in series with the battery, said reed switch and said capacitor for reducing current flow through said reed switch when said battery is connected to said capacitor.

25. A battery-powered fault indicator as defined in claim 22 wherein said high impedance display device comprises a liquid crystal display having at least one pair of display electrodes including a display segment electrode and an associated backplane electrode.

26. A battery-powered fault indicator as defined in claim 22 further including reset switch means user-actuable from the exterior of said housing for discharging said capacitor to condition said display device to said first display condition.

27. A battery-powered fault indicator as defined in claim 26 wherein said reset switch means comprise a reed switch magnetically actuable from the exterior of the housing.

28. A battery-powered fault indicator as defined in claim 27 wherein said reed switch is aligned generally parallel to the monitored conductor.

29. A battery-powered fault indicator as defined in claims 22 further including a reset circuit for automatically discharging said capacitor upon restoration of voltage in the monitored conductor to condition said display device to said first display condition.

30. A battery-powered fault indicator as defined in claims 29 wherein said reset circuit comprises transfer switch means having principal electrodes connected across said capacitor and a high impedance control electrode capacitively coupled to the monitored conductor.

* * * * *